US010392139B2

(12) United States Patent
Auburger et al.

(10) Patent No.: US 10,392,139 B2
(45) Date of Patent: Aug. 27, 2019

(54) CONTAINER PRODUCTION PLANT WITH COOLING OF THE BASE OF THE CONTAINERS

(71) Applicants: Michael Auburger, Neutraubling (DE); Wolfgang Sauspreischkies, Neutraubling (DE)

(72) Inventors: Michael Auburger, Neutraubling (DE); Wolfgang Sauspreischkies, Neutraubling (DE)

(73) Assignee: KRONES AG, Neutraubling (DE)

( * ) Notice: Subject to any disclaimer, the term of this patent is extended or adjusted under 35 U.S.C. 154(b) by 556 days.

(21) Appl. No.: 14/401,247

(22) PCT Filed: May 16, 2013

(86) PCT No.: PCT/EP2013/060135
§ 371 (c)(1),
(2) Date: Nov. 14, 2014

(87) PCT Pub. No.: WO2013/171299
PCT Pub. Date: Nov. 21, 2013

(65) Prior Publication Data
US 2015/0128531 A1     May 14, 2015

(30) Foreign Application Priority Data

May 16, 2012   (DE) ........................ 10 2012 104 267

(51) Int. Cl.
*B65B 3/26* (2006.01)
*B67C 3/02* (2006.01)
(Continued)

(52) U.S. Cl.
CPC ............ *B65B 3/26* (2013.01); *B29C 49/4273* (2013.01); *B67C 3/02* (2013.01); *B67C 3/023* (2013.01);
(Continued)

(58) Field of Classification Search
CPC .. B65B 3/022; B65B 3/04; B65B 3/26; B65B 3/326; B65B 63/08; B67C 3/023;
(Continued)

(56) References Cited

U.S. PATENT DOCUMENTS 4,557,301 A * 12/1985 Jörss ........................ B65B 3/26
141/102
5,033,254 A * 7/1991 Zenger .................. B65B 31/006
53/431
(Continued)

FOREIGN PATENT DOCUMENTS

DE     2006053193     5/2008
DE     2008026043    12/2009
(Continued)

OTHER PUBLICATIONS

International Search Report dated Aug. 29, 2013 issued in corresponding international application No. PCT/EP2013/060135.
(Continued)

*Primary Examiner* — Andrew M Tecco
*Assistant Examiner* — Nicholas E Igbokwe
(74) *Attorney, Agent, or Firm* — Onello & Mello, LLP

(57) ABSTRACT

An apparatus (1) for the production of plastics material liquid containers (10) with a conveying device (2) which conveys the plastics material containers (10) along a pre-set conveying path (P), with a shaping device (4) which shapes plastics material pre-forms into the plastics material containers (10), with a first filling device (12) which is arranged downstream of the shaping device (4) along the conveying path and which fills the plastics material containers (10) with a liquid, and with a cooling device (8) which is arranged between the shaping device (4) and the first filling device (12) and which cools at least one area of the wall of the plastics material containers (10) by acting upon it with a
(Continued)

Figure 1:
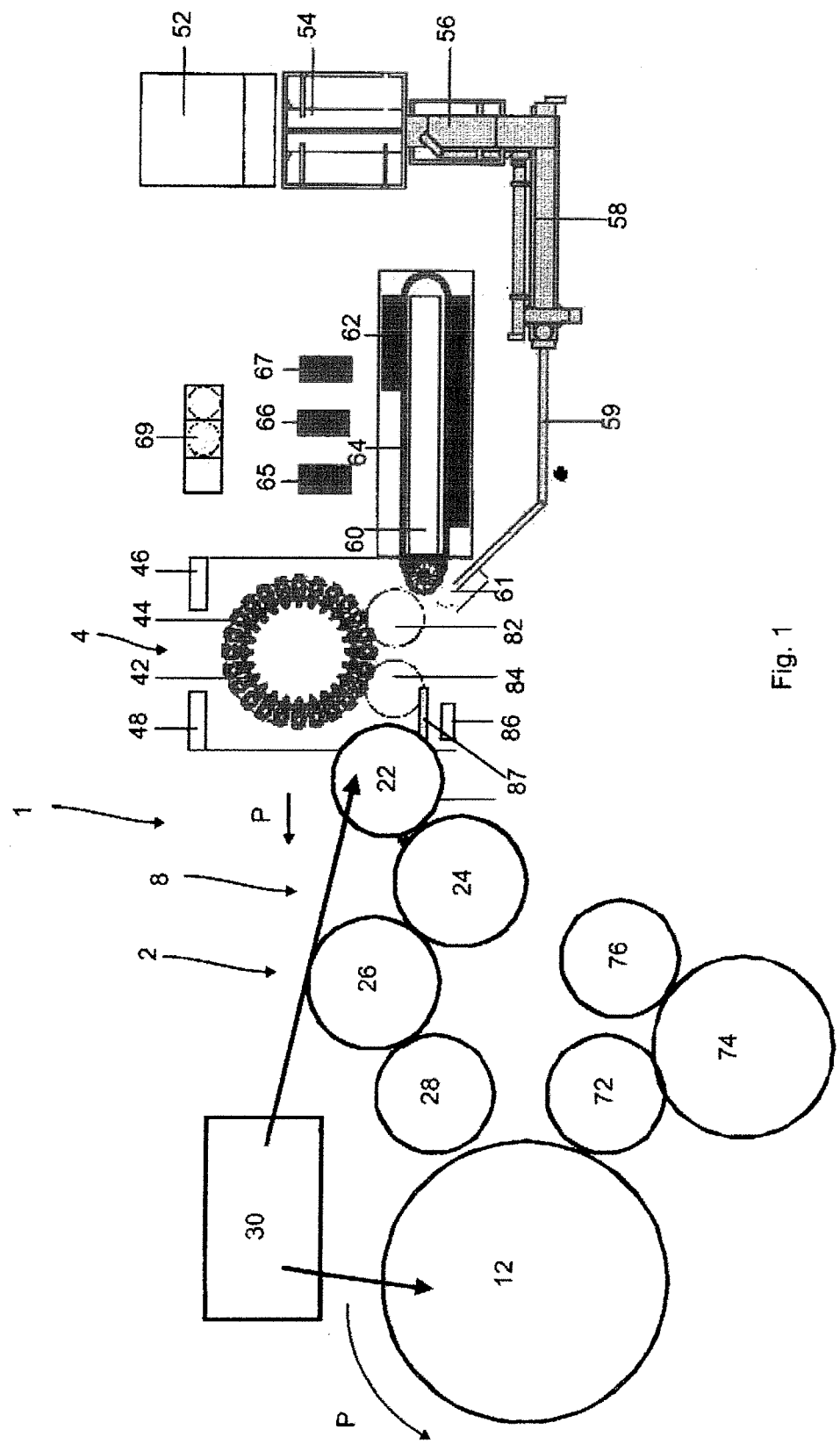

flowable medium. According to the invention the cooling device has a second filling device (8) which fills a liquid into the container, which liquid is used for cooling a base area (10*a*) of the plastics material container (10).

19 Claims, 2 Drawing Sheets

(51) Int. Cl.
  *B29C 49/42* (2006.01)
  *B67C 3/22* (2006.01)
  *B29C 49/06* (2006.01)
  *B29C 49/36* (2006.01)
  *B29C 49/66* (2006.01)
  *B29C 49/46* (2006.01)

(52) U.S. Cl.
  CPC .............. *B29C 49/06* (2013.01); *B29C 49/36* (2013.01); *B29C 49/66* (2013.01); *B29C 2049/4685* (2013.01); *B67C 2003/227* (2013.01)

(58) Field of Classification Search
  CPC .......... B67C 3/20; B67C 3/028; B67C 7/004; B67C 2003/227; B29C 49/10–12; B29C 2049/1238; B29C 49/78; B29C 35/007; B29C 35/0294
  USPC ......... 53/440, 452, 453, 127, 558, 559, 561, 53/266.1, 267, 240; 141/101
  See application file for complete search history.

(56) References Cited

U.S. PATENT DOCUMENTS

| | | | | |
|---|---|---|---|---|
| 5,251,424 | A * | 10/1993 | Zenger | B65B 31/006 53/431 |
| 5,642,761 | A * | 7/1997 | Holbrook | B67C 3/06 141/104 |
| 5,713,403 | A * | 2/1998 | Clusserath | B65C 3/16 141/101 |
| 5,996,322 | A * | 12/1999 | La Barre | B65B 3/022 198/347.1 |
| 6,305,438 | B1 * | 10/2001 | Sjoholm | B65B 3/26 141/114 |
| 7,010,900 | B2 * | 3/2006 | Grossmann | A61L 2/208 134/169 R |
| 7,900,422 | B2 | 3/2011 | Fischer | |
| 2010/0092337 | A1 * | 4/2010 | Iwashita | A61L 2/22 422/33 |
| 2010/0199604 | A1 * | 8/2010 | Fischer | B67C 7/0073 53/425 |
| 2011/0154785 | A1 | 6/2011 | Stolte | |

FOREIGN PATENT DOCUMENTS

| | | |
|---|---|---|
| DE | 2008048812 | 4/2010 |
| DE | 2009007424 | 8/2010 |
| EP | 2216160 | 8/2011 |
| WO | 2010046072 | 4/2010 |

OTHER PUBLICATIONS

German Search Report dated Jan. 1, 2013 issued in corresponding German application No. 10 2012 104 267.5.

* cited by examiner

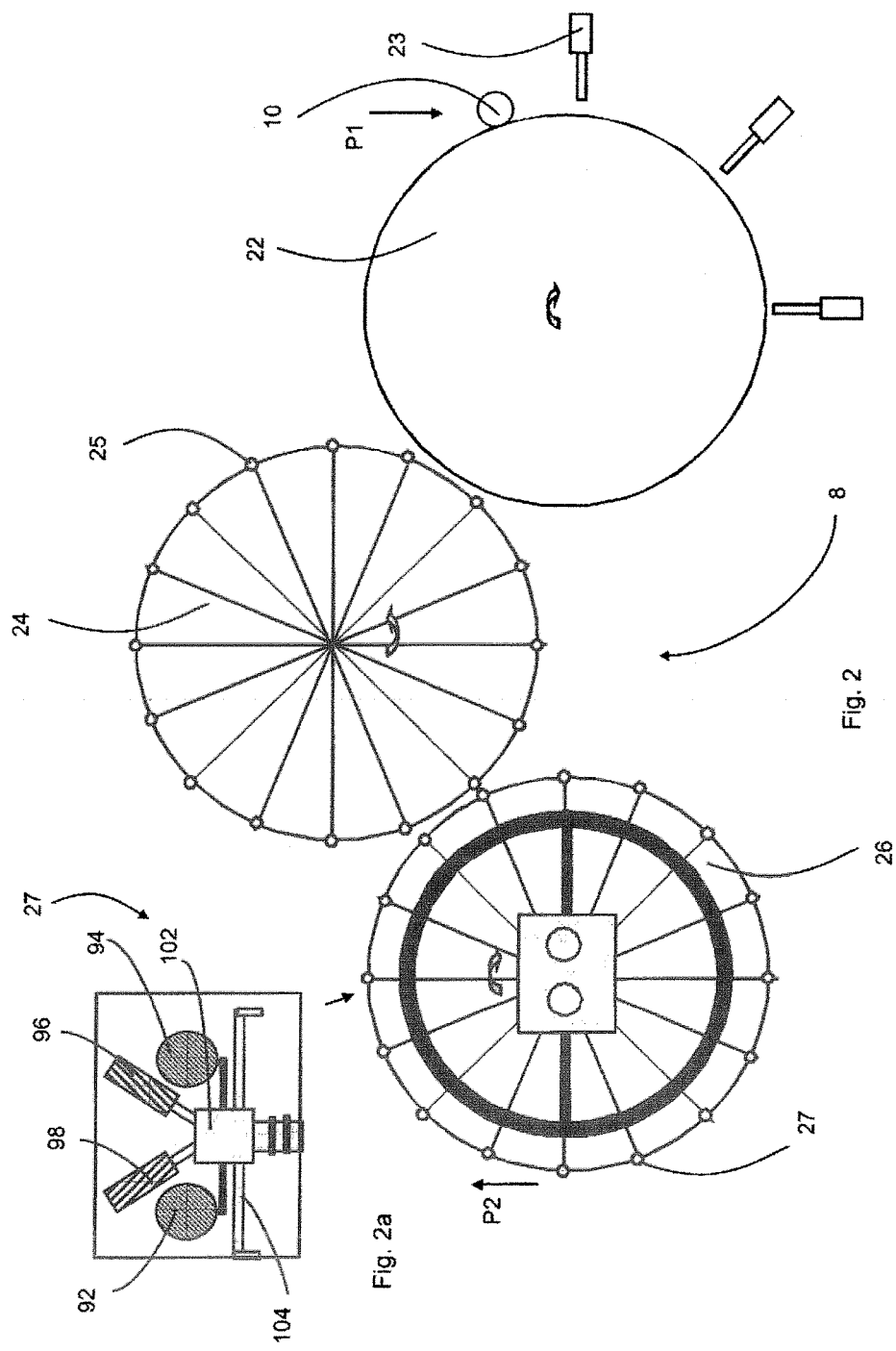

CONTAINER PRODUCTION PLANT WITH COOLING OF THE BASE OF THE CONTAINERS

RELATED APPLICATION

This application is a 371 national stage entry application of international Application No. PCT/EP2013/060135, filed on May 16, 2013, which claims the benefit of German patent application No. 10 2012 104 267.5, filed on May 16, 2012, the contents of which applications are incorporated herein in their entirety by reference.

The present invention relates to an apparatus and a method of producing liquid containers, and in particular beverage containers. Widely varying apparatus and methods of producing containers filled with beverages are known from the prior art. In recent years use has generally been made in this case of methods in which first of all empty plastics material containers are shaped out of plastics material pre-forms and these plastics material containers are then filled with a beverage. In this case the problem is also known in the prior art that the plastics material containers resulting from a blow moulding procedure have to be cooled, in particular in the base area, after their production. To this end, various methods and apparatus are known from the prior art.

In this way, EP 2 216 160 A1 for example describes an apparatus and a method of producing and further processing hollow plastics material bodies. In this case it is proposed that a corresponding apparatus should have a standing plate in the further processing machine, on which a hollow plastics material body is capable of being arranged in each case and the standing area of which corresponds at least in part to an external base contour of the hollow plastics material body. In this way, the hollow plastics material body is cooled by the aforesaid standing plate or the material thereof respectively. The drawback in the case of this procedure, however, is that the standing areas have to be adapted to the containers formed in each case or the base geometry thereof respectively.

DE 10 2008 048 812 A1 describes a method and an apparatus for the combined production and filling of containers of plastics material. In this case the container is cooled by the application of an atomized spray (i.e. from the outside) during the transfer. In addition, in the case of DE 10 2008 026 043 A1 a cooling of an area of the container is carried out by an atomized spray applied from the outside.

WO 2010 046 072 A1 likewise describes a method and an apparatus for the filling of containers. In this case the containers are acted upon by a medium in the region of a feed path of a filling device. During the stressing of the containers in the region of the feed path with the medium the containers are conveyed with open apertures downwards substantially in a perpendicular direction.

In addition, apparatus are known from the prior art in which plastics material containers, and in particular the PET containers which are particularly relevant in this case, are cooled by water nozzles directed onto the base after the blow moulding on a transfer to a filling device. This cooling is advantageous so that the containers for the filling—in particular of carbonated beverages—can be pre-stressed to the filling pressure required for this, without the base of the containers being deformed in an impermissible manner. In order to achieve the required cooling time of approximately from 2 to 4 seconds in a transfer, the latter is made correspondingly long. The cooling water is sprayed onto the base from the outside and the cooling of the base takes place by thermal conduction. In this case for example the cooling water is pumped in a circulating operation by way of a cooler.

This stressing of the containers from the outside allows an efficient cooling of the base area. Nevertheless, after this stressing the containers are damp on the outside, and this can prove disadvantageous for a subsequent labelling operation for example. In addition, a dry machine would also offer advantages in microbiological terms.

The object of the present invention is therefore to provide an apparatus for the production of containers filled with liquids, and in particular with beverages, which on the one hand allow for an efficient cooling of areas of the container, in particular a base area, but which on the other hand avoids dampness on the outer wall of the container. In addition, the use of adapters, which are to be adapted individually should be avoided.

This object is attained according to the invention by the subjects of the independent claims. Advantageous embodiments and further developments form the subject matter of the sub-claims.

An apparatus according to the invention for the production of plastics material liquid containers has a conveying device which conveys the plastics material containers along a pre-set conveying path. In addition, the apparatus has a shaping device which shapes plastics material pre-forms into the plastics material containers, as well as a first filling device which is arranged downstream of the shaping device along the conveying path and which fills the plastics material containers with a liquid. In addition, the apparatus has a cooling device which is arranged between the shaping device and the first filling device and which cools at least one area of the wall of the plastics material containers—in particular a base area of the plastics material containers—by acting upon it with a flowable medium.

According to the invention the cooling device has in this case a second filling device which fills a liquid into the container, wherein this liquid being used for cooling a base area of the plastics material container.

It is thus proposed according to the invention that the required cooling for the bottle should be achieved not by spraying from the outside but that the heat in the interior of the container should be dissipated by injecting a liquid. It is pointed out in this context that the designation as the first and second filling device should not be understood as being a reference to an arrangement of these filling devices along the conveying path of the containers. In the case of the embodiments shown here the second filling device is arranged upstream of the first filling device.

At first sight this does not seem advisable since a filling of the container, having still a warm base, with a carbonated beverage could be difficult. It is proposed in this case, however, that the filling procedure should be carried out in at least two steps as it were, in which a small portion of the liquid is first supplied for cooling the base and the complete filling of the container advantageously takes place at a later point in time (in which case, however, the base area of the container—in particular—has already been cooled by this point in time).

It is thus advantageous for a cooling of the base to have been already carried out with part of the medium to be filled.

Both a $CO_2$-free product and a $CO_2$-containing product can be used as a "coolant". In addition, it is possible for water or sterile water or even other liquids to be introduced into the container for cooling the base. In this case it is also possible to take into consideration a diluting effect of the cooling water by a suitable change in the production of the beverage (or during the subsequent filling of the greater part of the beverage respectively).

On account of the apparatus according to the invention it is possible to dispense with an external wetting of the containers for the cooling thereof.

In the case of a further advantageous embodiment the shaping device is a blow moulding device which shapes the plastics material containers by acting upon them with a gaseous medium, and in particular compressed air. It is advantageous for the shaping device to be a stretch blow moulding machine. In this way, the shaping device preferably has a stretching rod (in more precise terms, each shaping station 44 preferably has a stretching rod) which stretches the containers in the longitudinal direction thereof during the shaping procedure. In particular, for the stretch blow moulding machines mentioned here the cooling according to the invention of the base area is found to be particularly advantageous, since containers produced by stretch blow moulding machines frequently have a base area which is still relatively warm immediately after they have been produced.

In the case of a further advantageous embodiment the blow moulding device can also have a heating device for heating the plastics material pre-forms. In this case it is possible for this heating device to be arranged upstream of the blow moulding machine in the form of a furnace and for plastics material pre-forms first to be heated to the degree that they can be expanded in the blow moulding device to form plastics material containers. It would also be possible, however, for a production device for producing plastics material pre-forms to be arranged directly upstream of the shaping device, in which case this production device advantageously produces heated plastics material pre-forms.

In the case of a further advantageous embodiment the apparatus has a clean room in which at least one treatment step, and preferably a plurality of treatment steps, takes place or take place.

In this case it is possible for this clean room to have at least one wall which is (present) stationary with respect to this clean room and one wall which is movable with respect to this stationary wall.

In the case of a further preferred embodiment this clean room is designed in such a way that at least the filling procedure of the container takes place inside the clean room, and preferably, however, also the shaping procedure as well as the cooling procedure for the base of the container.

In the case of a further advantageous embodiment the apparatus has a sterilization device which sterilizes the containers and/or the pre-forms at least in sections. This sterilization device can have in this case for example an electron irradiation device or, on the other hand, a device which acts upon the plastics material containers with a sterilization medium such as for example peracetic acid or hydrogen peroxide. In this case it would be possible for a sterilization device of this type to sterilize the containers immediately after their production. In this ambodiment the sterilization device is arranged upstream of the second filling device in the conveying direction of the containers.

In the case of a further advantageous embodiment at least one conveying unit for conveying the plastics material containers is provided between the second filling device and the first filling device. This means that the containers are first filled at least slightly by the second filling device, in particular for the purpose of cooling, and only then they are filled by the first filling device. In this case it is possible for the second filling device itself to be designed in the form of a conveying unit which fills the containers during the conveying thereof. It would also be possible, however, for a further conveying means which only conveys the containers, i.e. does not fill them at the same time, to be provided between the second filling device and the first filling device.

In the case of a further advantageous embodiment during operation the shaping device for shaping the plastics material pre-forms into plastics material containers is blocked at least for a time with the filling device. This means that the shaping device and the filling device are operated at the same operating speeds at least for a time. In this way, buffer segments and the like for example can be avoided. It is advantageous for the shaping device and the first filling device to be operated permanently in block operation. In the case of a further advantageous embodiment at least one discharge device for the discharging of containers out of the production flow is possible between the shaping device and the filling device. In this case it would be possible for defective containers to be discharged out, or for example during or after a machine stop a discharging of containers takes place in order to avoid their filling.

In the case of a further advantageous embodiment the apparatus has at least one inspection device for inspecting the containers. This inspection device is advantageously likewise arranged between the shaping device and the first filling device in this case.

In the case of a further advantageous embodiment the apparatus has a metering device by which a portion of the product to be filled is metered by means of the second filling device into the plastics material containers. This means that the base area of the containers is already cooled with the product here.

In the case of a further advantageous embodiment the conveying device has a plurality of conveying units following in succession for conveying the plastics material containers. In the case of a further advantageous embodiment at least one of these conveying units is in this case a conveying star wheel or it advantageously has a rotatable carrier on which a plurality of holding elements for holding the containers are arranged. It is advantageous for at least one of these conveying devices also to have filling elements for filling the containers. These filling elements can be arranged so as to be stationary in this case (which is possible in particular in the case of small filling amounts) or can be moved jointly with the containers.

In the case of a further advantageous embodiment the apparatus has a cooling device for cooling the product to be filled by the second filling device. In this case the cooling device can be designed in such a way that it cools this first portion of the product to a temperature which is below room temperature. It would also be possible, however, for the cooling device to be designed in such a way that the second filling device fills the liquid medium into the just finished plastics material container at room temperature.

In the case of a further advantageous embodiment the apparatus has a control device which is controlled in such a way that it controls the introduction of the liquid by the first filling device in a manner dependent upon the filling of the liquid by the second filling device. In this case for example, the first filling device can take into consideration the quantity and also the composition of the liquid which has already been filled by the second filling device. If for example the second filling device fills only sterile water, this portion of sterile water already filled can be taken into consideration during the filling of the container with the second filling device. In addition, however, components already filled by the second filling device, such as for example aromatic substances, can be taken into consideration during the filling with the first filling device.

It is advantageous in this case for the control device to have a valve cluster which actuates one or more valves by which the supply of the liquids into the containers is controlled.

It would be additionally possible for the apparatus to have two or more filling devices which are arranged upstream of the first filling device and which accordingly fill a plurality of components of the product into the container. It is advantageous in this case for these filling devices to be arranged in such a way that they fill different quantities of a further product into the containers. In the case of a further advantageous embodiment the first filling device is designed in such a way that it fills a carbonated product, and in particular a carbonated beverage, into the containers.

The present invention further relates to a method of producing plastics material containers filled with liquid, in which plastics material pre-forms are first shaped by means of a shaping device to form the plastics material containers and these plastics material containers are then conveyed by means of a conveying device to a first filling device and are filled by this first filling device with a product for filling and in which at least one area of the plastics material containers between the shaping device and the first filling device is cooled by being acted upon with a flowable medium.

According to the invention, for the purpose of cooling, a pre-set portion of the product for filling is filled into the plastics material containers. It is advantageous for at least one base area of the plastics material containers to be cooled.

It is advantageous in this case for this pre-set portion to be filled into the containers by a second filling device, wherein this second filling device being arranged upstream of the first filling device in the conveying direction of the plastics material containers.

In the case of a further advantageous method the aforesaid pre-set portion, which is filled into the plastics material containers for the purpose of cooling, is less than 30% of the liquid to be filled in total into the plastics material container, preferably less than 20%, in a particularly preferred manner less than 10%, and in a particularly preferred manner less than 5% of the liquid to be filled in total into the plastics material container. In particular, if very small filling quantities are used, it is possible for these quantities not to be taken into consideration in the subsequent filling of the main part of the product or, on the other hand, to be taken into consideration with a standard value so that in this respect a further control is no longer necessary. In the case of a further advantageous method, however, the quantity of the liquid filled for the purpose of cooling is at least sufficient for wetting a base area of the container completely.

In the case of a further advantageous method the first filling device and the second filling device fill different components of the filling product into the container. In this way, it would be possible for example first for aromatic substances to be filled and then for a further liquid to be filled, but it would also be possible for the same medium, but preferably in different amounts, to be filled.

In the case of a further advantageous method the second filling device fills a non-carbonated liquid into the plastics material containers.

In the case of a further advantageous method the first filling device fills a carbonated liquid into the containers and/or after the filling by the first filling device a carbonation procedure is carried out.

In the case of a further advantageous method a partially filled container is conveyed or guided respectively over a further pre-set portion of the conveying path until the complete filling.

Further advantages and embodiments are evident from the accompanying drawings. In the drawings FIG. 1 is a diagrammatic illustration of a plant for the production of containers;

FIG. 2 is a detailed view of an embodiment of the plant shown in FIG. 1, and FIG. 2*a* is a detailed view of an injection device.

FIG. 1 is a diagrammatic illustration of an apparatus 1 for the production of beverage containers. In this case the reference number 52 refers to a tilting device for filling plastics material pre-forms into a storage container 54. The plastics material pre-forms are conveyed by means of an inclined conveyor 56 and a roller sorter 58 by way of a supply rail 59 to an inlet star wheel or single-break star wheel 61 respectively. The plastics material pre-forms are also separated at this inlet star wheel 61.

The reference number 60 refers to a linear furnace in which the plastics material pre-forms are heated. In this case a conveying chain is provided, on which a plurality of holding elements for holding the plastics material pre-forms are arranged. In this case it is additionally possible for the individual plastics material pre-forms to be rotated about their longitudinal axis. It is advantageous for the holding elements to be holding mandrels which engage in the apertures of the containers and hold them in this way. Instead of the linear furnace shown here, however, it would also be possible for other heating devices such as for example microwave furnaces to be used.

The plastics material pre-forms are heated by means of a plurality of heating devices or heater boxes 62 respectively whilst moving past. After that, the plastics material pre-forms are transferred to a blow moulding wheel 42 by way of a transfer wheel 82. This blow moulding wheel 42 has arranged on it a plurality of shaping stations 44 in which the plastics material pre-forms are shaped into plastics material containers. In this case, in more precise terms, the plastics material pre-forms are acted upon with compressed air and are expanded in this way against an inner wall of blow moulds. The reference number 86 designates an operating unit for this plant. The reference number 46 designates a water supply means for the shaping device and the reference number 48 designates an air supply means, such as in particular, a blow moulding air supply means. The reference number 4 designates the shaping device in its entirety.

In addition, cooling devices 69, heating appliances (heatset) 65, tempering appliances 66 and heatset tempering appliances 67 (illustrated only diagrammatically) can optionally be present. The reference number 84 designates a further transfer wheel by way of which the now blow moulded plastics material containers are discharged out of the shaping device 4.

In this case for example an air conveying device 87 (illustrated only in part here) can be attached to the shaping device.

The reference numbers 22, 24 and 26 refer in each case to conveying units which also act, however, as base cooling devices which are used according to the invention for cooling the base of the finished containers.

The reference numbers 28, 72 and 76 refer in each case to conveying star wheels which convey the containers. These individual conveying units thus determine the conveying path P which is illustrated only diagrammatically here and along which the containers are conveyed. The reference number 2 refers to the conveying device for the containers in the entirety thereof, which is formed by the individual conveying units 22, 24, 26, 72 and 74 [sic] mentioned above, as well as optionally by further conveying units.

The reference number 12 designates a first filling device which fills the containers with a liquid, and in particular a beverage. This filling device 12 is likewise advantageously used in this case as a conveying unit, i.e. the containers are preferably filled by the filling device 12 during the conveying thereof. In this case the filling device is preferably a rotation filler, and therefore preferably has a rotatable carrier on which the individual filling elements are arranged. In addition, still further filling units can be provided, for example a filling unit which after the filling with the product also fills a further medium such as for example a gas (in particular nitrogen or a nitrogen compound) into the already filled containers. It is advantageous for the first filling device 12 to fill a carbonated beverage into the containers.

The reference number 30 designates a control device in general, which controls the metering of the liquid into the three base cooling devices 22, 24, 26 and also the filling of the greater part of the liquid by the filling device 12—preferably in a manner dependent upon one another.

Finally, the reference number 74 designates a closure device which closes the now filled containers. In addition, the closure device advantageous conveys the containers in this case, i.e. the containers are advantageously conveyed during the closing thereof.

In this case it is possible for relatively small quantities of mixed, cooled but not yet carbonated beverages to be filled—in particular also before the carbonation—by way of the conveying units or base cooling devices 22, 24, 26 respectively which as a whole form the cooling device or the second filling device 8 respectively.

The supply of the product in the three conveying units 22, 24 and 26 which function [as] base cooling devices can be carried out in this case by way of a pipeline or a metal hose into a rotary distributor on the respective star wheels of the base cooling devices 22, 24 and 26, which has lines to the individual filling nozzles in each case. It is advantageous for these conveying units 22, 24, 26 which function as base cooling devices to have a plurality of filling elements which fill the containers for the purpose of cooling the base. In addition, these base cooling devices preferably also have holding elements for holding the individual containers, such as for example clamps, which grip the containers on the neck region thereof.

It is preferable in this case for a speed-dependent time control of the regulation to be carried out by way of the electronic system of the filling means. It is particularly preferred for the individual filling elements to fill the containers in each case at least in such a way that the base of the containers is completely wetted in order to achieve a cooling of the base in this way.

Extensive tests have revealed a required quantity of cooling liquid of from approximately 10 to 20 ml per container. The heat which is contained in the base and which is to be dissipated is absorbed by the product metered in and the plastics material of the bottle is cooled in this way. Inside the product the heat is rendered harmless and the base of the plastic bottle is stabilized for a filling with CO2-containing fillers in the filling machine connected downstream.

The cooling can be carried out by not yet carbonated filling material by branching out of the beverage mixer upstream of the carbonation module, in order to prevent foaming of the filling material under atmospheric filling conditions. The introduction of aromas provided separately (liquid or suspension from the solid) is likewise possible in order to connect the required cooling of the base to the additional uses of a metering of the aromas. This has the advantage that for example different types of beverage with a similar basic structure acquire their taste only by the metering of the aromas and a change of the types in the filling means without loss of the beverage or a simultaneous production of different beverages is made possible.

FIG. 2 shows a design of the cooling device designated with 8 as a whole. The containers 10 are supplied in this case along the arrow P1 and are removed again along the arrow P2, for example to a filling means. The containers which are empty at first are first filled—in this case by high-pressure injection devices 23. In this case these injection devices 23 are arranged so as to be stationary here and fill only very slight quantities (for example approximately 1 ml) into the individual containers 10 (illustrated only diagrammatically here). In this case the injection devices 23 can also be nozzles controlled with respect to time or volume. In this case it would also be possible for use to be made of a plurality of nozzles of this type which are controlled with respect to time and which fill different substances, for example different aromas, into the containers. In addition, it would also be possible for nozzles controlled with respect to time and volume to be used alternatively. This arrangement with the stationary injection devices is suitable, in particular, for low speeds (operating speeds).

In general, a product or even an aroma respectively can be filled in this case by way of a spur line arriving from a valve cluster.

After that, the containers are conveyed to the conveying device 24 with the filling devices 25 arranged thereon. These filling devices 25 move jointly with the conveying device 4 [sic] in this case. A filling device 25 is provided per holding device on this conveying device. These filling devices too can be nozzles controlled with respect to time or volume. In this case it is preferable for one filling device 25 to be associated in each case with one container, as a result of which higher (operating) speeds are made possible. In this case a central container (not shown) with liquid can be present or even a metering container upstream thereof. In this region a further quantity, such as for example from 10 to 20 ml, of liquid for example can be introduced into the containers. A further connection to an additional mixed sample by way of a valve cluster or by way of a control device 30 respectively (cf. FIG. 1) is optionally possible in this case. In addition, it is possible here for both the connection to an additional mixed sample and the use of a central container to take place in an alternative manner and it is preferable for the user of the plant to be able to choose from these two options.

In principle, it is possible for different aromas also to be introduced at the same time into the bottles in each metering star wheel—in this way different beverages are produced adjacent to one another.

In addition, the containers are fed further to the conveying device 26, in which case the supply of suspensions (for example particles in small sizes such as the order of magnitude of micrometres or nanometres) is possible in this region by way of filling devices 27. This nanometric metering can be carried out in this case for example by way of endless piston systems in a central annular boiler on the star wheel which is fed from a mixer. The advantage in this case is that it is possible to bring the suspension, without a long conveying path and thus uniformly concentrated, into the containers. A chamber metering means similar to a screw can also be used in these filling devices 27.

It is pointed out that the filling variants shown here for the metering of the product can also be combined or (in particular inside a plant) used alternatively. In this way for example, if a specified type of filling is not required, the corresponding conveying device (22, 24 or 26) can be replaced by a clamping star wheel which is preferably used only for conveying the containers.

In the case of a further preferred method the quantity metered in the scope of the preliminary metering is transmitted to a control device (or characteristic device thereof) and the aforesaid control device can take into consideration the quantity during the metering through the first filling device.

FIG. 2a is a more detailed illustration of a filling device of this type. In this case the reference number 104 refers to a carrier on which a filling valve 102 is arranged. Liquids can be supplied from two reservoirs 92 and 94 in each case to this filling valve 102, in which case this supply is controlled by way of valves 96 and 98. The metering unit is used for the introduction of suspensions at a defined concentration. Metering unit[s] of this type with endless pistons are used in a modified form in other fields of technology. In this way, in medicine or chemistry, suspensions of microparticles and nanoparticles are metered for example. One field of application is for example the compounding of plastics materials. In the case of a preferred method it is proposed to make aromas also available in solid form as minute particles in an optional manner.

In this way, it would be possible for the apparatus described to be used for the introduction of aroma particles into an existing filling technology in the beverage industry. The particle suspension can be introduced in this way without long conveying paths and thus advantageously without losses and without agglomeration into the product tank from the filling unit 26. From there the suspension is metered into the containers by way of valves controlled with respect to volume or time. In order to achieve the cooling effect, the quantity of the metered suspension is preferably exactly as great as in the case of the other metering units (24, 22). If the quantity of the suspension is not sufficient for this, supplementing with mixed beverage from a separate product container which is preferably attached to the metering star wheel is possible. Both an arrangement of the endless pistons on the rotating part and an arrangement on the standing part with a supply by way of a rotary distributor from below (not shown) are possible. The metering of the suspensions from the product tank into the containers can take place by way of filling valves according to the prior art in the beverage and pharmaceuticals industry with a filling tube or in the free jet method into the containers, in which case care should be taken to ensure a short product path. The dimension of the correct filling quantity is optionally implemented in this case according to the methods of time/pressure filling, rotary piston pumping, volumetric or even weigh filling.

It is advantageous for a common control to be provided which also takes into consideration further machine parts such as for example a (stretch) blow moulding machine. The information on the pre-metered quantities preferably passes by way of the common central control of the machine elements of the stretch blow moulding machine, the base cooling from the inside and the filling means for the purpose of cooling. The residual filling quantity for achieving the legally prescribed minimum filling quantity, which is filled from the filling means, is calculated from this information.

This is particularly important if liquid is to be metered into a container with a plurality of metering units. The control must then forward the quantity metered as a whole to the filling means in order to prevent an overfilling or underfilling.

In the case of a preferred method the quantity supplied (or pre-metered respectively) to the containers through the first filling device is determined in a manner dependent upon that quantity of heat which is to be extracted from the base area. It is advantageous for at least a quantity of heat to be extracted such that the subsequent filling process no longer leads to undesired deformation of the containers.

In addition, it is possible for the filling by the second filling device and the filling by the first filling device to be adjusted with respect to each other or to be controlled in a manner dependent upon each other. In this way for example, the quantity and optionally also the constituents of the liquid filled by the first filling device are taken into consideration during the filling of the product by the second filling device. The following product components are suitable in a particular way for the cooling or the pre-metering respectively: water, not yet carbonated product, carbonated product, solids as suspension dissolved with water.

The Applicants reserve the right to claim all the features disclosed in the application documents as being essential to the invention, insofar as they are novel either individually or in combination as compared with the prior art.

LIST OF REFERENCES

1 apparatus
2 conveying device
4 shaping device
8 second filling device
10 container
12 first filling device
22, 24, 26 conveying units used as cooling devices
23 injection device
25 filling device
27 filling device
28 conveying star wheel
30 control device
42 blow moulding wheel
44 shaping station
46 water supply
48 air supply
52 tilting apparatus
54 storage container
56 inclined conveyor
58 roller sorter
59 supply rail
60 heating device, linear furnace
61 inlet star wheel
62 heating box
65 heating plants
66 tempering appliance
67 tempering appliance (heatset)
69 cooling device
72, 76 conveying star wheel
74 closure device
82 transfer wheel
84 further transfer wheel
86 operating unit
37 air conveying device
92, 94 reservoirs
96, 98 valves 102 filling valve
104 carrier
P conveying path
P1 supply direction
P2 removal direction

The invention claimed is:

1. A method of producing plastics material containers filled with liquid, comprising:
shaping plastics material pre-forms by means of a shaping device to form the plastics material containers and conveying the plastics material containers by means of a conveying device to a first filling device and filling the plastics material containers using the first filling device with a product for filling; and
cooling at least one area of the plastics material containers between the shaping device and the first filling device by being acted upon with a flowable medium, wherein, for the purpose of cooling, a pre-set portion of the product for filling is filled into the plastics material containers by a second filling device,
metering a portion of the product to be filled by means of the second filling device into the plastics material containers,
wherein the product for filling is at least one of water, carbonated product, solids as suspension dissolved with water or aromatic substances, the pre-set portion of the product for filling remains inside the plastics material containers during and after the filling by the second filling device and the plastics material containers maintain a filling position during the filling by the second filling device, and wherein the product for filling has the same composition as the pre-set portion of the product for filling.

2. A method according to claim 1, wherein the pre-set portion is less than 30% of a total amount of liquid to be filled into the plastics material containers by the first and second filling devices.

3. A method according to claim 1, wherein the first filling device and the second filling device fill different components of the filling product into the container.

4. A method according to claim 1, wherein the second filling device fills a non-carbonated liquid into the plastics material containers.

5. A method according to claim 1, further comprising conveying the plastics material containers between the second filling device and the first filling device by at least one conveying unit.

6. A method according to claim 1, wherein the conveying device comprises a plurality of conveying units following in succession for conveying the plastics material containers.

7. A method according to claim 6, wherein at least one of the plurality of conveying units comprises a rotatable carrier on which a plurality of holding elements for holding the containers are arranged.

8. A method according to claim 1, further comprising cooling the product to be filled by the second filling device by a cooling device.

9. A method according to claim 1, further comprising controlling the filling of the liquid by the first filling device in a manner dependent upon the filling of the liquid by the second filling device by a control device.

10. A method according to claim 1, wherein the shaping device comprises a stretch blow moulding machine.

11. A method according to claim 1, wherein the first filling device and the second filling device fill different components of the filling product into the container.

12. An apparatus for producing plastics material containers and providing a filling product into the plastics material containers, comprising:
a conveying device for conveying the plastics material containers along a pre-set conveying path;
a shaping device for shaping plastics material pre-forms into the plastics material containers;
a first filling device arranged downstream relative to the shaping device along the conveying path and which fills the plastics material containers with a liquid; and
a cooling device arranged between the shaping device and the first filling device which cools at least one area of a wall of the plastics material containers by acting upon it with a flowable medium,
wherein the cooling device comprises a second filling device which fills a liquid into the container, which is used for cooling a base area of the plastics material container, wherein the liquid filled into the plastics material containers by the second filling device and the liquid filled into the plastics material containers by the first filling device each comprise components of the filling product of the plastics material container, and
wherein the filling product is at least one of water, carbonated product, solids as suspension dissolved with water or aromatic substances, the liquid filled into the plastics material containers by the second filling device comprising components of the filling product remains inside the plastics material containers during and after the filling by the second filling device and the plastics material containers maintain a filling position during the filling by the second filling device.

13. An apparatus according to claim 12, wherein at least one conveying unit for conveying the plastics material containers is provided between the second filling device and the first filling device.

14. An apparatus according to claim 12, wherein the conveying device comprises a plurality of conveying units following in succession for conveying the plastics material containers.

15. An apparatus according to claim 14, wherein at least one of the plurality of conveying units comprises a rotatable carrier on which a plurality of holding elements for holding the containers are arranged.

16. An apparatus according to claim 12, wherein the apparatus comprises a cooling device for cooling the product to be filled by the second filling device.

17. An apparatus according to claim 12, wherein the apparatus comprises a control device which is controlled in such a way that it controls the filling of the liquid by the first filling device in a manner dependent upon the filling of the liquid by the second filling device.

18. An apparatus according to claim 12, wherein the shaping device comprises a stretch blow moulding machine.

19. An apparatus according to claim 12, wherein the first filling device and the second filling device are provided for filling different components of the filling product into the container.

* * * * *